United States Patent
Erickson

(10) Patent No.: US 7,471,692 B1
(45) Date of Patent: Dec. 30, 2008

(54) METHOD AND APPARATUS FOR MAXIMIZING CALL CONNECT RATE IN A REMOTE ACCESS APPLICATION

(75) Inventor: Eric V. Erickson, Mt. Prospect, IL (US)

(73) Assignee: UTStarcom, Inc., Alameda ( * ) Notice: Subject to any disclaimer, the term of this patent is extended or adjusted under 35 U.S.C. 154(b) by 1162 days.

(21) Appl. No.: 10/051,897

(22) Filed: Jan. 17, 2002

(51) Int. Cl.
*H04L 12/28* (2006.01)
*H04L 12/56* (2006.01)
*H04Q 7/00* (2006.01)
*H04Q 7/28* (2006.01)
*H04Q 7/20* (2006.01)
*H04B 7/00* (2006.01)

(52) U.S. Cl. .............. 370/431; 370/329; 370/341; 370/395.2; 455/509; 455/452.1

(58) Field of Classification Search ............. 370/431, 370/328–329, 330, 341, 310.2, 315–316, 370/319–321, 335–337, 342–345, 217–220, 370/395.2; 455/509, 512–514, 450–452.2, 455/453
See application file for complete search history.

(56) References Cited

U.S. PATENT DOCUMENTS

| 4,866,708 | A | | 9/1989 | Ardon et al. .......... 370/95.1 |
| 5,046,181 | A | | 9/1991 | Higuchi et al. .......... 370/58.1 |
| 5,280,630 | A | * | 1/1994 | Wang .................. 455/452.2 |
| 5,831,976 | A | * | 11/1998 | Lin et al. ................. 370/329 |
| 6,035,207 | A | * | 3/2000 | Wang et al. ............... 455/509 |
| 6,137,875 | A | | 10/2000 | Mo ....................... 379/24.1 |
| 6,487,677 | B1 | * | 11/2002 | Jantz et al. .................. 714/2 |
| 6,810,343 | B2 | * | 10/2004 | McKee .................... 702/81 |
| 6,963,926 | B1 | * | 11/2005 | Robinson ................ 709/239 |
| 6,977,899 | B1 | * | 12/2005 | Matragi et al. ........... 370/237 |
| 7,002,906 | B1 | * | 2/2006 | Basso et al. ............... 370/218 |
| 2001/0010681 | A1 | * | 8/2001 | McAllister et al. ....... 370/228 |

FOREIGN PATENT DOCUMENTS

| EP | 0 389 887 A2 | 10/1990 |
| EP | 0 389 887 A3 | 10/1990 |

\* cited by examiner

*Primary Examiner*—Ronald Abelson

(57) ABSTRACT

An apparatus and method for maximizing call connect rate in a remote access application. The method uses an adjustable hunting algorithm for allocating calls to channels to be connected. The method described categorizes the channels based on their past performances into groups that are preferred to be used. The results of the channels performances are accumulated and saved in order to decide which channels are to be used more often than others. The channels that perform the worst will be used sparingly, thus reducing the possibility that they may be locked out. This gives the PSTN switch the most optimal number of channels to choose from since the least number of channels will be locked out. Since the best performing channels will be used most often, the system will have maximized its overall connect rate. The channels will constantly be monitored in order to guarantee that the next most effective available channel will be used for all incoming calls.

25 Claims, 7 Drawing Sheets

METHOD AND APPARATUS FOR MAXIMIZING CALL CONNECT RATE IN A REMOTE ACCESS APPLICATION

FIELD OF THE INVENTION

This present invention relates to maximizing connection rates of a system, and more particularly, to a method and apparatus for reducing the probability of removing a channel from service by a PSTN (Public Switched Telephone Network) switch.

BACKGROUND OF THE INVENTION

PSTN trunks (i.e., Public Switched Telephone Network communication line between two switching systems) are intranode communication links in a network. A trunk can connect any combination of Internet Packet Exchange (IPX), Internet Gateway Exchange (IGX) or other nodes. Trunks are activated after node configuration by a telco (i.e., local telephone company). PSTN protocol is responsible for path establishment, release and other call relating signaling. PSTN protocol may not be able to control the call procedures, but rather the PSTN protocol transfers information about the line state. The PSTN protocol has a relatively small functional part, which is concerned with path setup, release of the path, call collision resolution and handling of new calls. The PSTN basically connects point A to point B.

A defective PSTN trunk generates signaling errors during attempted call setup or call teardown. Other resources coupled to the setup or teardown process may also generate errors. For example, an internal resource such as a Digital Signal Processor (DSP) can generate signaling errors as well. These errors are tracked by a PSTN switch which, based on exceeding counter thresholds for a given period, may remove the resource or channel (e.g., PSTN trunk) from service. This is undesirable because the customer paying for use of this trunk from the switched network is not able to use this trunk as it is disabled by the network. This may result in lost revenue for the customer. In addition, the customer must often pay a service fee to have this trunk restored to service by the telco which provides this trunk, which results in unnecessary service or maintenance fees. A PSTN trunk may fail due to several reasons. Errors within the PSTN can originate from human error, acts of nature, hardware or software failure, or overloads. The majority of errors result from human error or hardware failure.

An effective PSTN trunk results from the effectiveness of the hunting algorithm used to determine the availability of open channels for use of channel related resources. Any one of the shared resources or entities within a system may develop problems that when allocated and used in the course of handling an incoming or outgoing call, may cause that call to fail. This call failure is recorded as accumulated and compared to the number of accumulated call successes and call attempts. The ratio of call successes to the call attempts is the call success rate. As the number of call failures increases the call success rate declines.

An additional problem due to defective resources, is that a defective resource such as a PSTN trunk or an internal DSP resource, would cause the call connect rate (i.e., percentage of successful calls) to be disproportionately skewed which would make the quality of the system appear to be far worse than it was.

The call success rate is an important metric when comparing Remote Access Server (RAS) products from different vendors. Lower call success rates imply greater lost calls and lost revenues to the customer. Even though a single instance of a resource may fail, this may interact with the switch's own trunk group hunting algorithm to exacerbate the accumulation of failed calls. A switch's channel hunting algorithm may "stop" at a particular channel, offering new calls that are immediately rejected by the RAS equipment only to be immediately offered another call (which will also be rejected) if that channel has an instance of a failed resource. This cycle of offered call, reject the call, and another offered call to the same channel can continue indefinitely. Even though there may be other channels available for use, the switches hunting algorithm must first move on beyond this faulty channel before they can be used. This situation then biases the offered calls toward a defective channel dramatically reducing the call success rate. Consequently, existing hunting algorithms do not focus on maximizing call connect rate, thus the call connect rate can be substantially worse. Moreover, existing hunting algorithms do not attempt to minimize the PSTN (switch) busying out channels.

It would be desirable to provide a method of selecting reliable resources and channels for use in order to provide stable service to customers. For example, a known substandard resource would not be desirable for use. In addition, it would also be desirable to provide a method of restoring resources and channels to service after the resources and channels have been removed from service.

SUMMARY OF THE INVENTION

In view of the above, a method for evaluating and selecting channels is provided. The method includes receiving connection outcome results of previous call connections, generating a statistical analysis based at least in part, on the connection outcome results and assigning an incoming call to a channel based at least in part, on the statistical analysis. In another embodiment, the method further includes the step of storing the connection outcome results in a buffer after receiving the connection outcome results from previous call connections. In yet another embodiment, the method further includes the step of classifying the channel based at least in part, on the statistical analysis.

In still another embodiment, an apparatus for maximizing call connect rate in a remote access application is provided. The apparatus includes a channel evaluator, a storage buffer, and a call router. The channel evaluator is operable to generate a statistical analysis based at least in part, on connection outcome results. The storage buffer is operable to store the connection outcome results. The call router is operable to route incoming calls based on the statistical analysis.

In still another embodiment, a method of maximizing the call connect rate is provided using a channel evaluator. The connect rate may be maximized by using reliable channels. Channels are evaluated using several different statistical means, and unreliable channels are used last. In one aspect, upon determination that a channel has increased or decreased its performance, it may be moved into an appropriate priority pool for use. Also, in another aspect, after a significant amount of time, all of the channels may be placed back into the uncertain pool for reevaluation.

These as well as other features and advantages of the present invention will become apparent to those of ordinary skill in the art by reading the following detailed description, with appropriate reference to the accompanying drawings.

DESCRIPTION OF FIGURES

Presently preferred embodiments of the invention are described below in conjunction with the appended drawing figures, wherein like reference numerals refer to like elements in the various figures, and wherein.

DETAILED DESCRIPTION OF EXEMPLARY EMBODIMENTS

In accordance with embodiments of the present invention, a method is provided for selecting and allocating channel related resources so as to minimize the possibility of a PSTN switch removing a channel from service, while maximizing the overall connect rate of the system. In addition, a method is provided for restoring channel related resources once the channel related resources have been removed from service.

Figure 1:
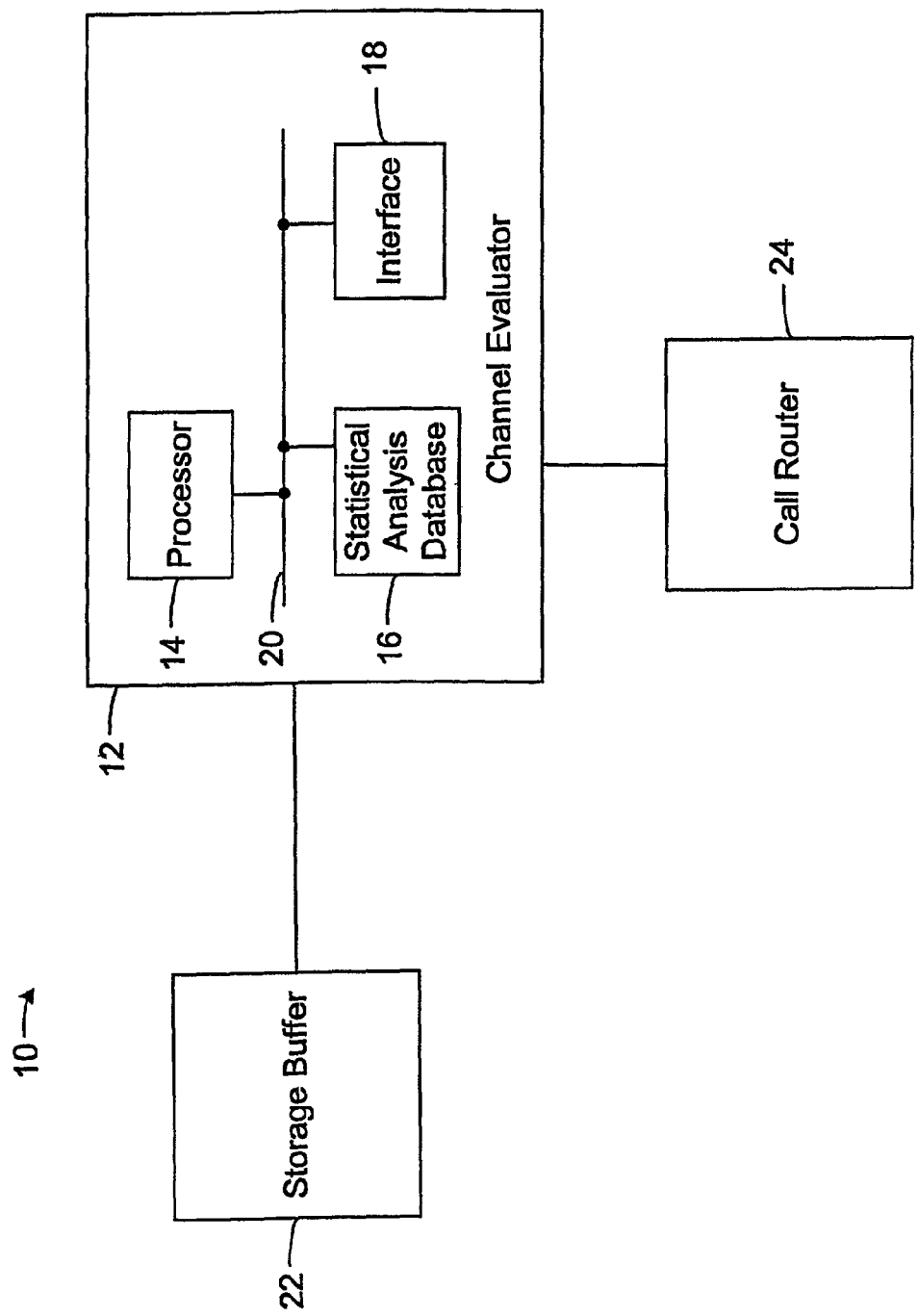
FIG. 1 is a system diagram illustrating functional components of the present invention.

FIG. 1 is a system diagram illustrating functional components of the present invention. A system 10 is provided comprising a storage buffer 22, a channel evaluator 12 and a call router 24. The channel evaluator 12 comprises a processor 14, a statistical analysis database 16, an interface 18, and a bus 20. The storage buffer 22, channel evaluator 12 and call router 24 are coupled together in order to communicate with each other. The processor 14 of the channel evaluator 12 is operable to generate a statistical analysis of incoming calls at the call router 24, and the processor 14 stores this statistical analysis in the statistical analysis database 16. The processor 14, the statistical analysis database 16, and the interface 18 all communicate across the bus 20. The storage buffer 22 stores call connection outcome results, similar to the generated statistical analysis. The call router 24 receives the incoming calls and assigns a channel or resource to each incoming call, based at least in part on the statistical analysis. The call router 24 and the storage buffer 22 communicate with the channel evaluator 12 through the interface 18. The interface 18 may be a wireless communications interface, or a hardwired interface.

In one embodiment, the channel evaluator 12 measures failures associated with any channel related resource per unit time. A channel resource device may consist of any device used in a communication session, from the origination of the information to the final receipt of the information. In particular, a channel related resource may include a modem (in a pool of modems, for example), a codec, a modem bank station, an internal TI time-slot interface device, a Dynamic Shared Object (DSO) or other related internal entities used to process or be the destination for an incoming call. For example, dial tone generators, Dual Tone Multi-Frequency (DTMF) receivers and ringing generators may all be considered channel resource devices as well as other PSTN devices. A channel resource device may also consist of one instance in a pool of devices or entities such as a modem, a codec, an internal time-slot, a DSO or other related entities used to process or be the destination of an outgoing call.

Figure 2:
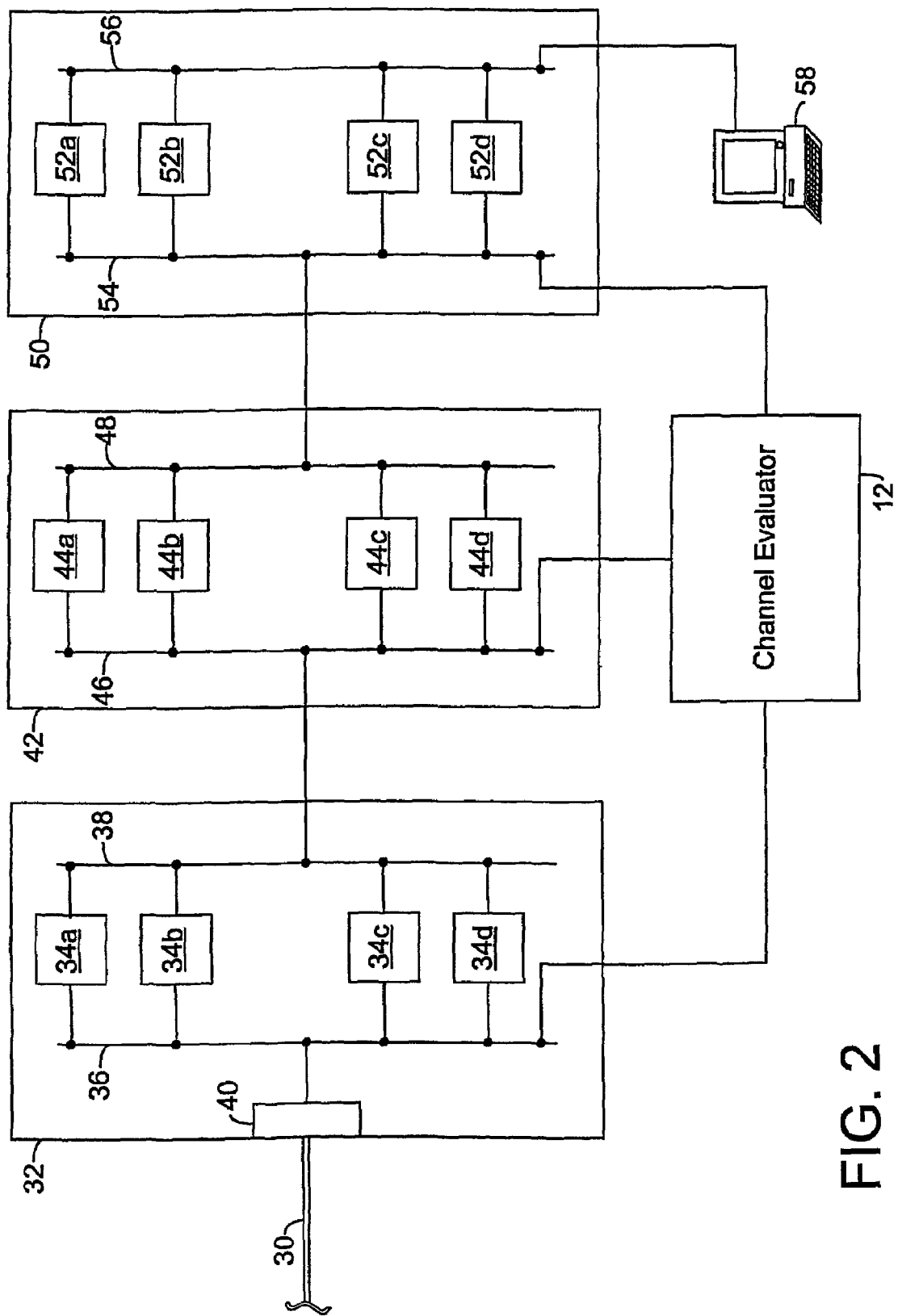
FIG. 2 is another system diagram illustrating functional components of the present invention.

FIG. 2 is another system diagram illustrating another embodiment of the present invention. The channel evaluator 12 is illustrated coupled with a bank of modems 32, a bank of processors 42 and a bank of application cards 50. In this manner, the channel evaluator may evaluate all of the channels shown in FIG. 2. The channels may include an individual modem in the bank of modems, an individual processor in the bank of processors, and an individual application card. As discussed subsequently, the channel evaluator evaluates how a specific channel resource (such as a specific modem, processor, application card) is performing. Based on the evaluation of the channel evaluator, the channel resource may or may not be used. For example, if a specific channel resource, such as a certain modem, may be subject to failures, the channel resource may be deemed "bad" and therefore not used except in exceptional circumstances.

The bank of modems comprises a plurality of modems 34a-d. A input line 30 is coupled to a port 40 of the bank of modems. The input line 30 may be a T1 line carrying data information. A modem input bus 36 couples inputs of the modems 34a-d, the port 40 and the channel evaluator 12. A modem output bus 38 couples outputs of the modems with the bank of processors 42.

The bank of processors 42 comprises a plurality of processors 44a-d. The processors 44a-d may be any microprocessor, Digital Signal Processor (DSP) or any other processor. A processor input bus 46 couples inputs of the processors 44a-d to the modem output bus 38. A processor output bus 48 couples outputs of the processors 44a-d with the bank of application cards 50. The bank of application cards 50 comprises a plurality of application cards 52a-d. An example of an application card is a point of sale network card or remote access transaction card which may approve or decline credit card inquiries. Another example of an application card is a Voice Over Internet Protocol (VOIP) network card, or a facsimile over IP network card. An application card input bus 54 couples inputs of the application cards 52a-d with the processor output bus 48. An application output bus 56 couples outputs of the application cards 52a-d with a computer 58.

Figure 3:
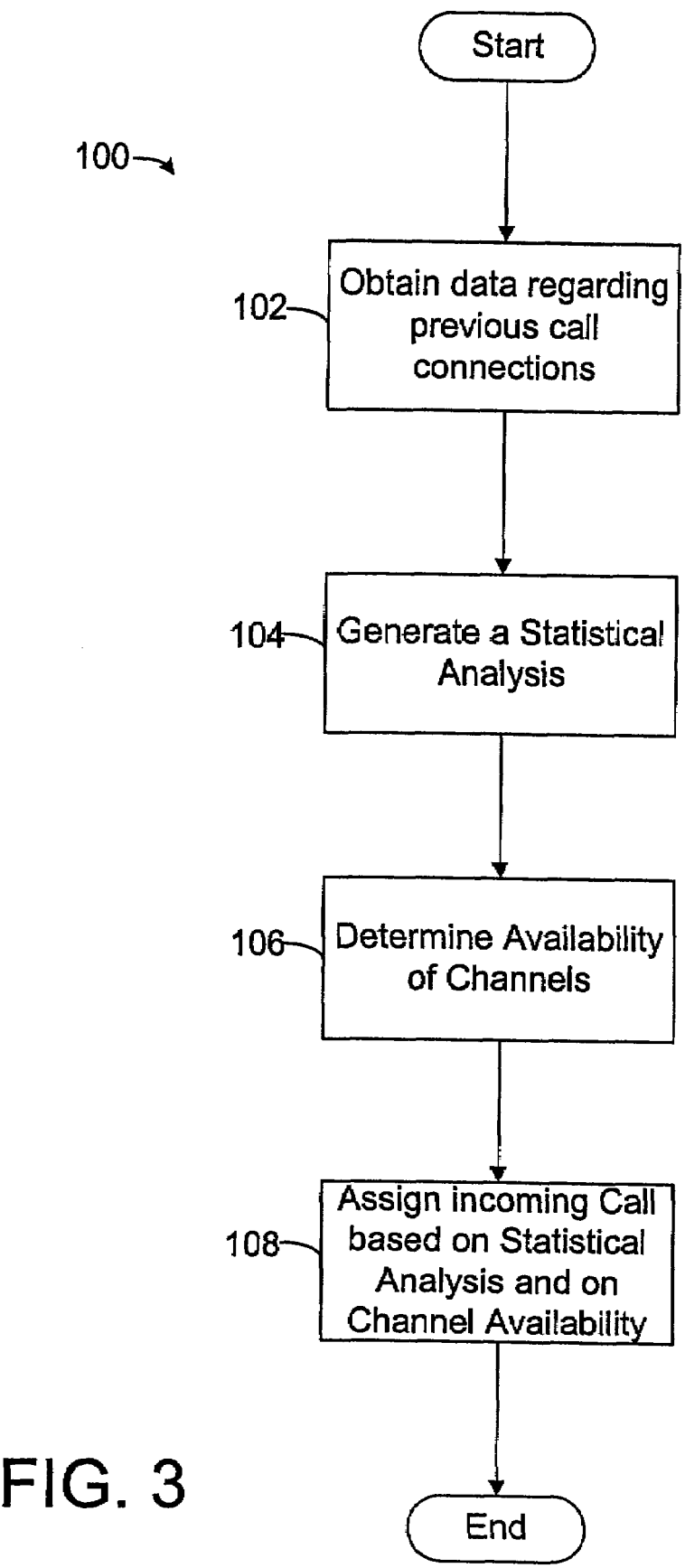
FIG. 3 is a flowchart illustrating a method employed in one embodiment of the present invention.

FIG. 3 is a flowchart illustrating a channel selection method 100 employed in one embodiment of the present invention. The channel selection method 100 begins when the call router 24 determines that a call needs to be allocated to an appropriate channel or resource. Initially, the channel evaluator 12 obtains data regarding previous call connections as shown at block 102 from the channels. Examples of data obtained may be the outcome of the call connection (e.g., success or failure), the channel number (in order to the identify of a specific channel, such as a modem, processor, time slot, etc.), the time, the date, and the previous call duration. After obtaining the data, the channel evaluator 12 generates a statistical analysis as shown at block 104 based on the data. Examples of techniques of analyzing the data are a moving average, a time weighted average, an asymmetric moving average, a combination of averages, and a time dissolve average. The statistical analysis is generated in an attempt to determine the quality of the channels.

Following the statistical analysis, the call router 24 determines the availability of the existing channels as shown at block 106. For example, in a bank of modems, the call router 24 determines which modems are available (i.e., currently not in use). The call router 24 determines which channels are in use by determining which "good" channels are available, and also which "bad" channels are available. The call router 24 then assigns the incoming call to a channel based on the statistical analysis and on the channel availability as shown at block 108. For example, the call router 24 determines, based on the modems which are available, which modems are classified as "good" and which modems are considered "bad." The calls are attempted to be assigned to the "best" available channel first, followed by attempting to connect to the next "best" available channel next. The "bad" channels are tried last, or not at all. The "bad" channels may be used if all of the preferred channels are not available and additional resources may be required. After a successful connection is made, the channel selection method 100 is complete.

In one embodiment, those channel resource devices that have the highest failure rate per unit time are not is used or are used as a last resort, post-poning any call failures as much as possible. If the defective resources are used then some benefit is derived by postponing their use as the call success rate will be increased due to the higher number of successful calls before the defective resources are encountered. For example, if a single defective channel is present, all other channels are in use before the known "problem" channel is used (which cannot be blocked or busied out). Thus, the maximum number of call successes 1s achieved. This, in turn, maximizes the call success rate given the defective channel. If the blocking or busy-out facility is available for this switch signaling protocol then the number of times the defective channel is attempted to be used is also minimized, lessening the possibility that the switch will "permanently" remove the corresponding switch channel from service. This method of resource selection (or post ponement) can be used in conjunction with other hunting algorithms. For instance, it can be used with basic hunting algorithms such as First Available or Next Available algorithms. The only modification is that if the per resource failure rate per unit time exceeds some threshold, then the usage of that resource is post-poned in favor of the "next" resources the base hunting algorithm (e.g., First Available, Next Available) would select.

There are "automatic" methods for detecting and blocking or busying out channels which identify problems and this is effective where the signaling protocol (e.g., custom variations to ISDN Primary Rate signaling and SS7) to the switch allows notification of blocked or busied out channels. But not all PSTN protocols allow this facility. The channel selection method 100, in one aspect, addresses certain signaling protocols. Even when the switch permits this blocking or busy out facility, if a channel is "busied out" too frequently, the switch (depending on implementation) may remove that channel from service in such a way that customer and telco interaction is required to restore it to service. The channel selection method 100 can be used in the presence or absence of the busy-out or blocking facility to minimize the number of call failures and prevent the switch from permanently removing channels from service.

The channel selection method 100 can also be a method of resource selection (or postponement) and can be used in isolation of other hunting algorithms. It would select the resources in the order of "most likely first" and "least likely last". In one embodiment, initially, all resources would have the same success (or failure) rate. This case degenerates into the "First Available" method described above. As a channel takes calls successfully, its success rate increases (per unit time) and it becomes preferred to be used in subsequent calls (when it is available). Likewise, any channels with incrementing call failures are selected last behind channels which have not yet taken any calls.

Figure 4:
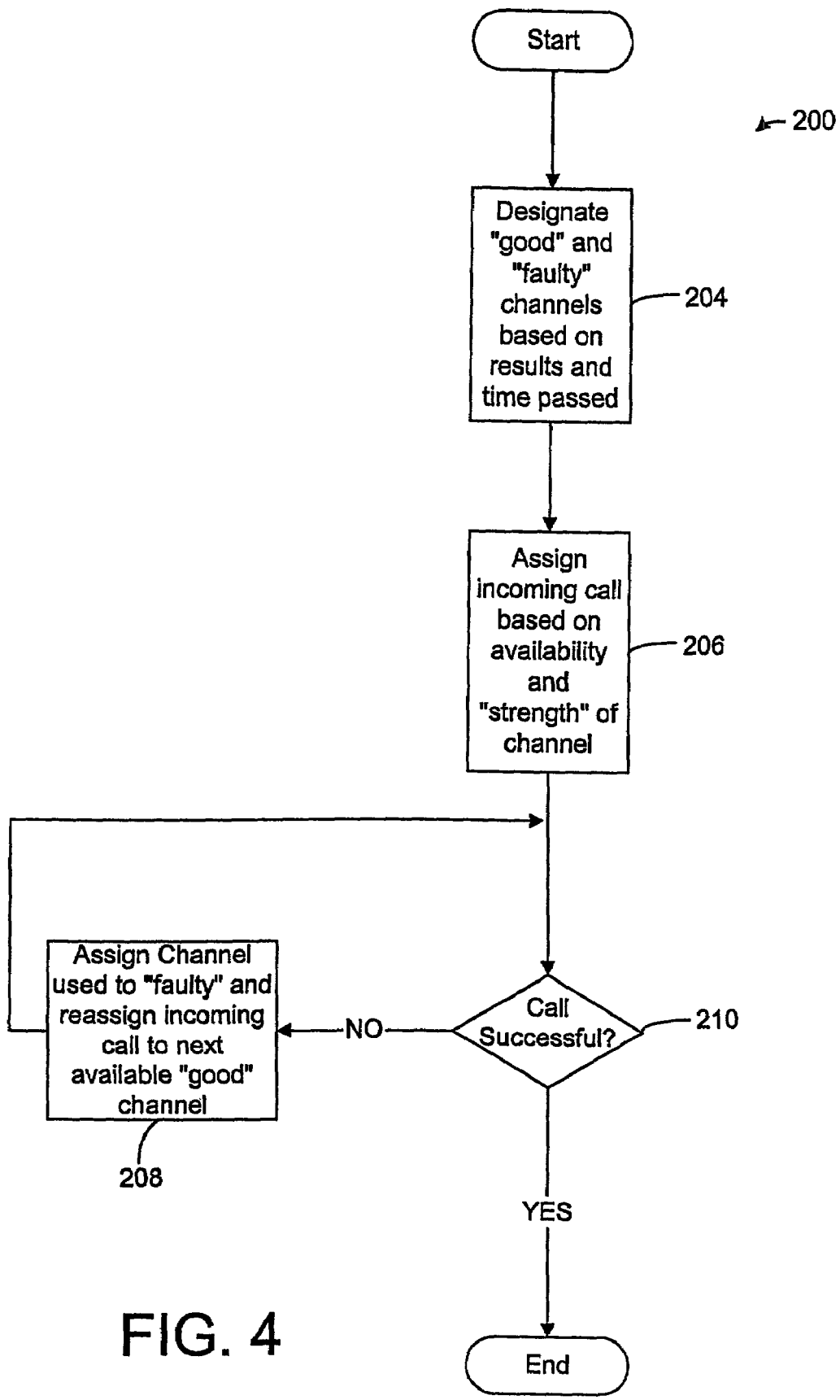
FIG. 4 is another flowchart illustrating a method employed in another embodiment of the present invention.

At the systems 10 startup, all of the existing channels of the system 10 may, for example, be placed into an "uncertain" pool to be selected from. Upon successful connection of a call through a channel, the call may then be placed into a "good" pool to be reselected from. Upon unsuccessful connection of a call through a channel, the call may then be placed into a "bad" pool. After designation of all of the channels, the channels may then be used based upon their previous performance, and based upon the availability of open channels. The channels placed into the "bad" pool may be used as a last resort, and those channels placed into the "good" pool may be used at the first available opportunity. The "bad" channels may be used if no other channels are available. This designation method 200 is shown in the flowchart of FIG. 4. After receiving an incoming call, the system 10 designates which channel to route the call to based on past results as shown at block 204. The system 10 also makes this decision based on the amount of time passed which determines which results to take into account. For example, after one hour of collecting data, all channels may be placed back into their initial categories. This may require the system to keep a record of the performances of the channels in use. After making this decision, the call may then be assigned as shown at block 206 to the most effective available channel. Next, the decision may be made if the call is successful as shown at block 210. If the call is successful, then this procedure is finished, and the next incoming call is taken. If the call is unsuccessful, then the channel is assessed a failure, and the call is then reassigned as shown at block 208 to the next most effective available channel.

Figure 5:
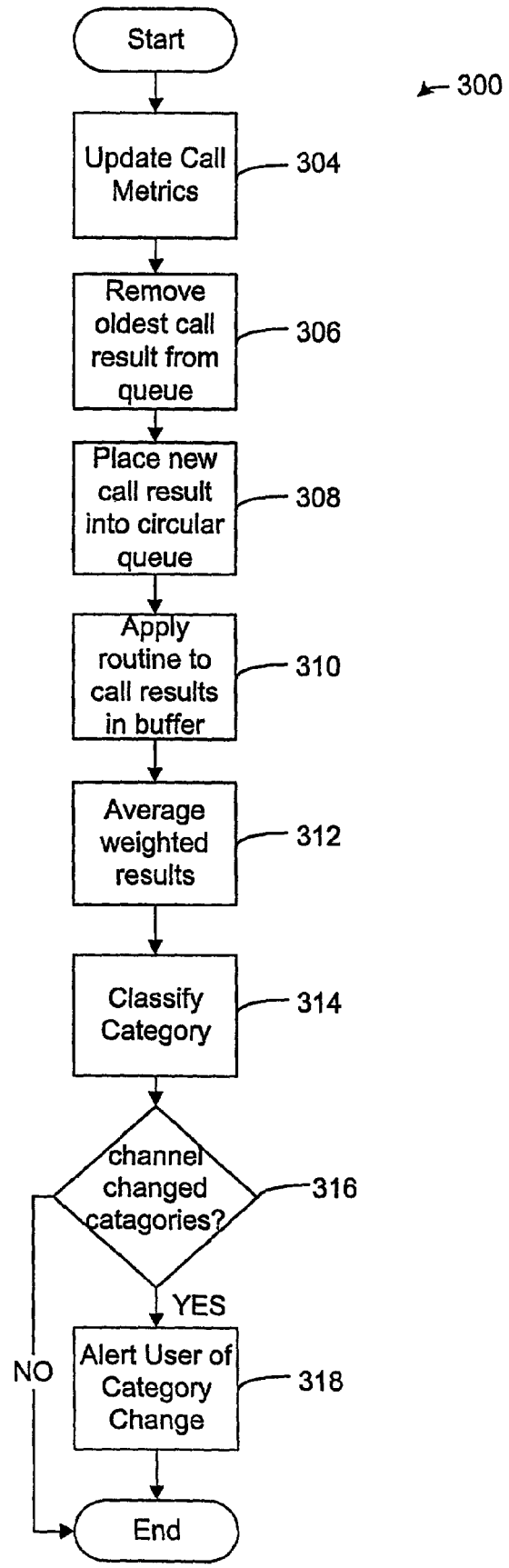
FIG. 5 is a flowchart illustrating detailed features of the methods described within FIGS. 3 and 4.

After the completion of each call connection, a classification method 300 as outlined in FIG. 5 is performed. It begins with the notification of a completed call connection. Upon notification of completing a call as shown at block 304, the oldest call result from the channel used is removed from the circular queue as shown at block 306. This can be done simply by replacing the new call result in place of the old one, in which case this and the next step can be combined. The new call result from the channel used is then placed into the circular queue as shown at block 308. The rest of the calls in the buffer are shifted down one position. A weighting method is then applied to the call results in the circular buffer as shown at block 310. If this is a moving average, then this step can be skipped. Any one of several weighting methods may be used: simple (no weighting), time-weighted, asymmetrical weighting (success gets one value, and failure gets another), or a combination of weighting methods (time-weighting and asymmetrical weighting). The weighted results are then averaged as shown at block 312. This may be done by adding all N weighted results and dividing by N. For embedded systems, it is desirable to select N as a power of two so division is implemented as bit shifting the value to avoid incurring the penalty of sophisticated math routines.

Next, the channels are then classified as shown at block 314 based on the metric calculated, into the corresponding category that the channel belongs, for example, preferred or not-preferred. The number of categories may extend to an indefinite amount. They may depend on the number of channels present. The channels may be placed into two separate categories, or they may be individually ranked according to their past performances. As an additional feature to make this method adaptive, that is self adjusting if the channel resources have been repaired or are no longer a problem, the call success and failures are accumulated with respect to unit time. This allows a "faulty" channel to move into the "good" (preferred) category when it no longer experiences problems (it successfully handled calls). Likewise, a previous "good" channel resource may be moved to the "faulty" (not-preferred) category if it experiences a recent string of failures. In this example, two categories are used for simplicity ("good" or preferred and "faulty" or un-preferred); however, this technique can be applied to more categories, for example, "preferred", "neutral" and "not-preferred". In still an alternate embodiment, the channels may be ranked (e.g., from best to worst). A decision may then be made whether or not the channel changed categories as shown at block 316. If the channel did not change categories, then this procedure is finished. If the channel did have opposite results than the past and it did change categories, then the user is alerted as shown at block 318 to this change.

The classification method 300 emphasizes successful calls and failed calls per resource be accumulated as described in FIG. 4. A reasonable metric such as (but not limited to) a ratio of call successes to call attempts or call failures to call attempts is used to prioritize the usage of channel resources. A channel may initially be placed into the preferred pool and used from it, but after failures exceed the pre-determined amount for successful connections, it may then be placed into the unpreferred pool. This adaptive method may be implemented in several ways. One method is to reduce both the values of the successful and failed call accumulations gradually over time, such that the resources would eventually return to the initial state (at power up) assuming a long period of no calls. In other words, old successes and old failures are eventually forgotten. Another method is to reduce the call successes and failures after "N" call attempts where "N" is the length or duration of the moving average.

Figure 6:
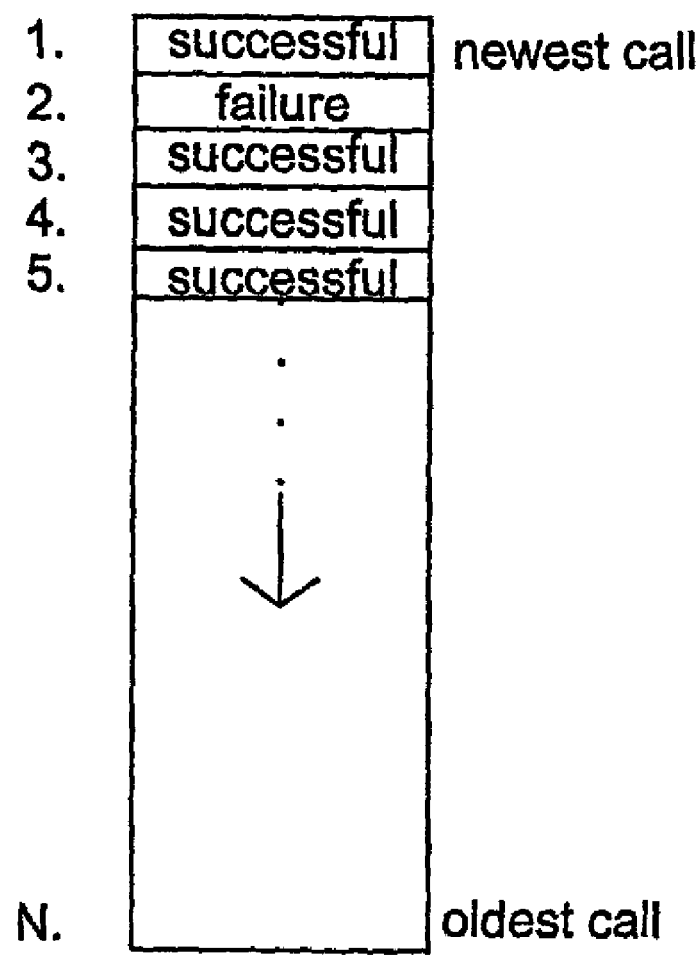
FIG. 6 is a diagram illustrating detailed features of a method described within FIG. 5.

A moving average can be implemented using a circular queue for each channel resource. This is illustrated in FIG. 6. Each circular queue 402 has a depth "N" (moving average length) and stores "success" or "failure" for a call. The position, in the circular queue 402 corresponds to a past call, the value of this position corresponds to its outcome ("success" or "failure"). As a new call succeeds or fails, the oldest "N"th call result is removed from the queue, and the newest result is inserted into the queue. The metric is obtained by applying a "method" to evaluate the circular queue's 402 content. The metric method may be a simple average, time-weighted average, asymmetrical average or the combination of time-weighted and asymmetrical weighting. The depth of the average combined with the metric method determines how quickly a channel resource moves from category to category. An implementation may implement just one of the above methods (or other similar methods such as "windowing", where each position in the queue has its own weighting) or it may offer selection of some or all of the above methods to the end customer via SNMP or CLI configuration. This metric can also be used to determine when channel resources should be automatically removed or restored from service when the PSTN signaling protocol supports the block or busy-out facility.

As a customer troubleshooting tool, an indication can be provided that alerts the customer to a channel resource changing categories as shown in step 318 in FIG. 5. This indication may be accomplished in several ways: a typical method would be by the issuance of SNMP traps to a trap server. There would be a trap indicating the identification of the channel resource and the category to which it had just moved. Another method for alerting the customer would be an SNMP read-only object that displays the current category for each channel resource. There would also be GUI and Command Line Interface (CLI) displays that would also display the current category of each or any queried channel resource.

Figure 7:
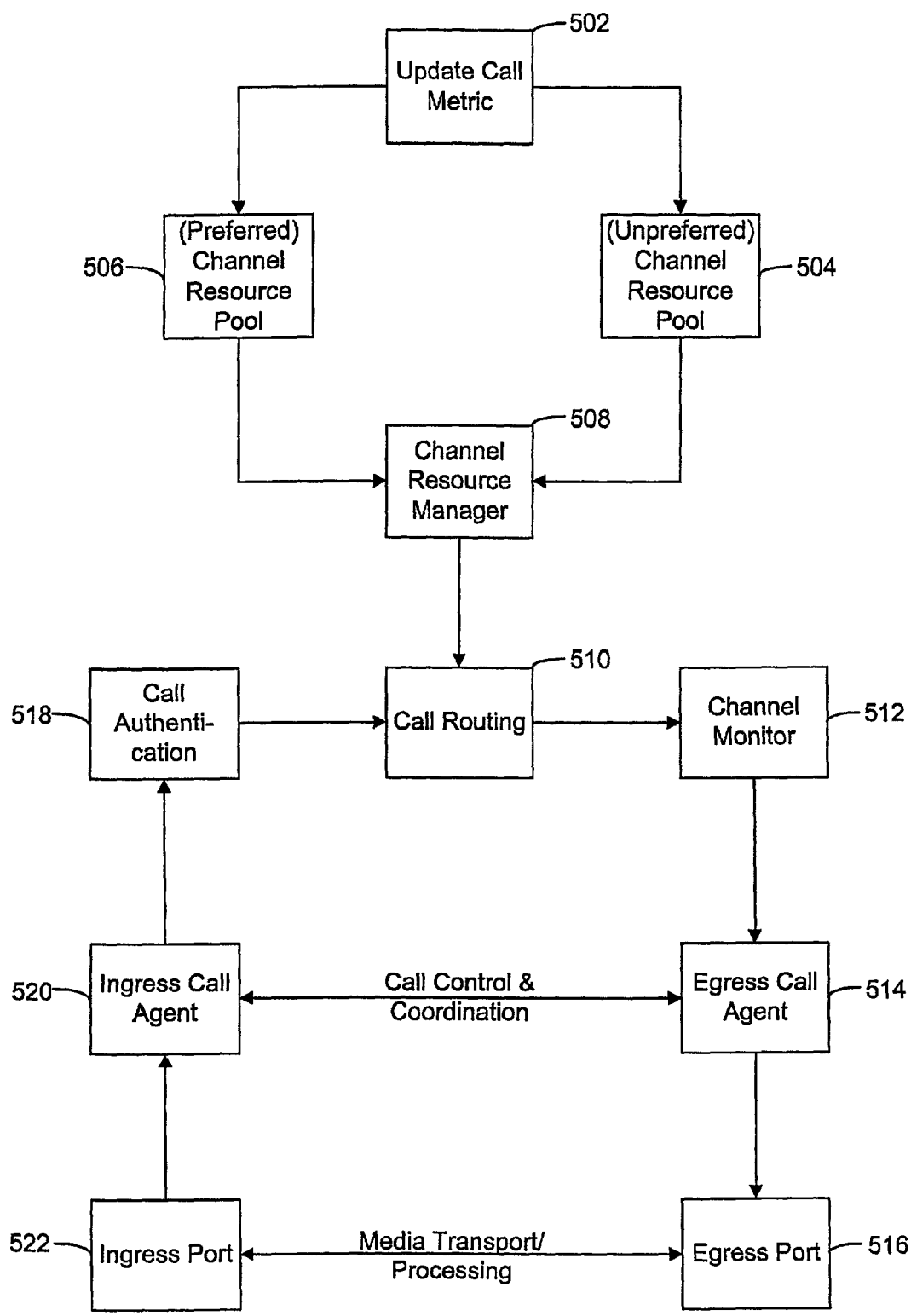
FIG. 7 is a system block diagram illustrating one embodiment of the present invention.

As merely one example, the channel evaluator 12 may be used with the TC-1000 Total Control Hub, from 3Com Corporation of Santa Clara, Calif. FIG. 7 illustrates one possible embodiment of the present invention using the TC-1000 Total Control Hub. Update Call Metric as shown at block 502 may include the method described in FIG. 5. As described previously, after determining the category of the channel, the channel is placed into a preferred channel resource pool as shown at block 506, or into an unpreferred channel resource pool as shown at block 504, or other categories depending on the amount of categories desired. The Ingress Port as shown at block 522 refers to a DS0 terminating on a HiPer DSP card which terminates T1 and E1 spans. It is the physical media termination of the ingress call. The call authentication as shown at block 518 determines if the ingress port is authorized to process a call. The call routing as shown at block 510 determines the appropriate egress port based on the ingress port, application, and user selected criteria, and it receives channel resources from the Channel Resource Manager as shown at block 508. The Ingress Call agent as shown at block 520 resides within the HiPer DSP card and is responsible for requesting the authentication of the call (say via a RADIUS server) and determining how the call will be handled.

An egress (IP) gateway is selected by static association with the HiPer DSP card and the corresponding modem is selected via the "Least Likely Last" allocation method described above. The modem is in this case the channel related resource in a "modem" pool. The Channel Resource Management as shown at block 508 function is responsible for the selection of the appropriate modem. It is used by the call routing as shown at block 510. The Channel Monitor as shown at block 512 function performs statistics updated after each call, which in turn drives updating the preference category of the modems in the modem pool. It is also responsible for the busying-out of channels (when available), and calling Update Call Metric as shown at block 502 from FIG. 3. The Egress call agent as shown at block 514 is the call processing module on the HiPer Router Card of the Total Control Hub (TC-1000) which sends the data packaged for IP transport over the Egress Port (Ethernet). It may or may not reside on the same location as the egress port.

As another example, the channel evaluator 12 is used within the TC-1000, but the Call Authentication and Call Routing functions are performed on the HiPer Router Card instead of the HiPer DSP card. The Channel Resource management Function is then performed on the HiPer Router Card as well as the "Least Likely Last" allocation method, and the Channel monitor Function which reclassifies the modem pool preference categories.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa. For example, the channel evaluator 12 may be implemented within the methods of FIGS. 3, 4, and 5 as a terminate and stay ready task on a computer.

It will be apparent to those of ordinary skill in the art that methods involved in the system may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

I claim:

1. A method for evaluating and selecting channel resource devices, comprising the steps of:
    providing a communication platform comprising at least one ingress port, at least one egress port, and a plurality of channel resource devices, in which said channel resource devices operate to establish call connections in the communication platform between the at least one ingress port and at least one egress port;
    providing a channel evaluator, the channel evaluator coupled to the plurality of channel resource devices in the communication platform;
    receiving an incoming call and determining, at a call router, that the call needs to be assigned to an appropriate channel resource device, the call router coupled to the channel evaluator;
    obtaining, at the channel evaluator, connection outcome results of previous call connections handled by the channel resource devices wherein the connection outcome results are indicative of channel resource device failures;
    after obtaining connection outcome results, generating, at the channel evaluator, a statistical analysis based at least in part, on the connection outcome results of previous call connections handled by the channel resource devices wherein the generated statistical analysis provides an indication of reliability of the channel resource devices located in the communication platform; and
    assigning, at the call router, the incoming call to at least one available channel resource device of the plurality of channel resource devices, said at least one available channel resource device selected at least in part, in response to the generated statistical analysis in the selection.

2. The method of claim 1, wherein the step of assigning an incoming call to the at least one available channel resource device is performed using the statistical analysis to identify channel resource devices that successfully connect calls.

3. The method of claim 1, wherein a non-preferred channel resource device is one which fails to connect calls, and wherein the step of assigning an incoming call to the at least one available channel resource device, comprises to not assign the incoming call to the non-preferred channel resource device.

4. The method of claim 1, further comprising the step of storing the connection outcome results in a buffer, the step of storing being performed after the step of receiving connection outcome results from previous call connections.

5. The method of claim 4, wherein the buffer is a circular buffer.

6. The method of claim 1, wherein the statistical analysis is a no weighting method.

7. The method of claim 1, wherein the statistical analysis is a time-weighted method.

8. The method of claim 1, wherein the statistical analysis is an asymmetrical weighting method wherein success receives one value, and failure receives another value.

9. The method of claim 1, further comprising the step of classifying the available channel resource device based at least in part, on the statistical analysis.

10. The method of claim 1, wherein the method is self adjusting in which, an available preferred channel resource device becomes an available non-preferred channel resource device due to a failed call connect attempt, and the available non-preferred channel resource device becomes the available preferred channel resource device due to a successful call connect attempt.

11. The method of claim 10, further comprising the step of indicating to a user a change in channel resource device status.

12. The method of claim 1, further comprising the step of determining which channels resource devices are available.

13. The method of claim 1, further comprising assessing a failure to the available channel resource device upon an unsuccessful call connection through the channel resource device.

14. The method of claim 13, further comprising reassigning the incoming call to a next preferred available channel resource device.

15. The method of claim 1, wherein the available channel resource devices are one of a plurality of ingress ports, a plurality of egress ports, and a plurality of channel processors.

16. The method of claim 1, where in the available channel resource devices are a plurality of ingress ports, a plurality of egress ports and a plurality of channel processors.

17. The method of claim 1, where in available channel resource device failures are hardware failures.

18. The method of claim 1, where in available channel resource device failures are software failures.

19. The method of claim 1, wherein the channel evaluator is coupled to each of the channel resource devices in the communication platform.

20. The claim 1, further comprising:
    classifying, based at least in part on completion of the call, the at least one available channel resource device as a channel resource device that is selected from the group consisting of preferred channel resource devices and non-preferred channel resource devices.

21. The method of claim 1, where in the at least one available channel resource device is selected from the group consisting of a bank of modems, a bank of processors, and a bank of application cards.

22. An apparatus for maximizing call connect rate in a remote access application comprising in combination:
    a channel evaluator on a communication platform in which the communication platform comprises at least ingress port, at least egress port, and a plurality of channel resource devices, the channel evaluator coupled to the plurality of channel resource devices, in which said channel resource devices operate to establish call connections in the communication platform between the at least one ingress port and at least one egress port in which the channel evaluator is operable to (i) obtain connection outcome results, and after obtaining connection outcome results, and (ii) generate a statistical analysis based at least in part, on connection outcome results indicative of channel resource device failures wherein the generated statistical analysis provides an indication of reliability of the channel resource devices located in the communication platform;
    a storage buffer for storing the connection outcome results, the storage buffer coupled to the channel evaluator; and a call router for routing incoming calls to available channel resource devices selected in response to the generated statistical analysis, the call router coupled to the channel evaluator.

23. The apparatus of claim 22, wherein the channel evaluator classifies available channel resource devices, at least in part on the statistical analysis generated from the previous call connect results.

24. The apparatus of claim 22, wherein the channel evaluator classifies channel resource devices, at least in part on the availability of channel resource devices.

25. The apparatus of claim 22, wherein incoming calls are assigned to available channel resource devices, and connected to the available channel resource devices through the call router based at least in part, on the statistical analysis.

* * * * *